(12) United States Patent
Davis

(10) Patent No.: US 12,346,433 B2
(45) Date of Patent: Jul. 1, 2025

(54) SYSTEMS AND METHODS FOR REAL-TIME CYBER INCIDENT DETECTION IN DATA SPARSE ENVIRONMENTS USING ARTIFICIAL INTELLIGENCE

(71) Applicant: Capital One Services, LLC, McLean, VA (US)

(72) Inventor: Spencer Davis, McLean, VA (US)

(73) Assignee: Capital One Services, LLC, McLean, VA (US)

(*) Notice: Subject to any disclaimer, the term of this patent is extended or adjusted under 35 U.S.C. 154(b) by 285 days.

(21) Appl. No.: 17/815,976

(22) Filed: Jul. 29, 2022

(65) Prior Publication Data

US 2024/0037228 A1 Feb. 1, 2024

(51) Int. Cl.
*G06F 21/55* (2013.01)

(52) U.S. Cl.
CPC .................. *G06F 21/554* (2013.01)

(58) Field of Classification Search
CPC ..................................... G06F 21/554
See application file for complete search history.

(56) References Cited

U.S. PATENT DOCUMENTS

| | | | | |
|---|---|---|---|---|
| 10,657,603 | B1* | 5/2020 | Harding | G06F 16/116 |
| 10,778,701 | B2* | 9/2020 | Perilli | G06N 5/046 |
| 11,062,199 | B2* | 7/2021 | Li | G06F 16/20 |
| 11,151,660 | B1* | 10/2021 | Harding | G06Q 40/08 |
| 11,205,103 | B2* | 12/2021 | Zhang | G06V 10/774 |
| 11,238,539 | B1* | 2/2022 | Harding | G06N 20/00 |
| 11,288,673 | B1* | 3/2022 | Venturelli | G06F 18/214 |
| 11,367,022 | B2* | 6/2022 | Zuluaga | G06F 21/552 |
| 11,455,569 | B2* | 9/2022 | Valdez | G06N 20/00 |
| 11,568,317 | B2* | 1/2023 | Hu | H04M 15/51 |
| 11,647,030 | B2* | 5/2023 | Medalion | G06N 20/00 726/23 |
| 11,710,081 | B2* | 7/2023 | Abrahamian | G06Q 40/03 705/75 |
| 11,816,539 | B1* | 11/2023 | Granson | G06N 5/01 |
| 11,818,163 | B2* | 11/2023 | Sharma | G06F 18/214 |
| 11,868,862 | B2* | 1/2024 | Zhang | G06N 7/01 |
| 11,893,465 | B2* | 2/2024 | Hu | G06N 20/20 |
| 12,020,257 | B2* | 6/2024 | Laptiev | G06Q 20/4016 |
| 12,026,626 | B1* | 7/2024 | Pardeshi | G06N 3/048 |

(Continued)

OTHER PUBLICATIONS

Jian Chen et al., Credit Card Fraud Detection Using Sparse Autoencoder and Generative Adversarial Network in 2018 IEEE 9th Annual Information Technology, Electronics and Mobile Communication Conference (IEMCON) Vancouver, BC, Canada, 2018, pp. 1054-1059 (Year: 2018).*

(Continued)

*Primary Examiner* — Sharon S Lynch
(74) *Attorney, Agent, or Firm* — Foley & Lardner LLP

(57) ABSTRACT

The systems and methods use a gradient boosted decision tree, which may be trained in data sparse environments. The system also uses a data transformation step to collapse complex data into a standardized feature input (e.g., a fixed length feature input) that may be processed by the model with a constant (or near-constant) lookup time and with minimal latency. Finally, the system generates a dual variable output that provides both a metric of whether a communication is fraudulent and/or unauthorized as well as a confidence level of that determination.

19 Claims, 4 Drawing Sheets

(56) References Cited

U.S. PATENT DOCUMENTS

| | | | | |
|---|---|---|---|---|
| 2018/0165554 | A1* | 6/2018 | Zhang | G06N 3/045 |
| 2019/0312890 | A1* | 10/2019 | Perilli | H04L 63/145 |
| 2019/0392351 | A1* | 12/2019 | Zuluaga | G06N 20/20 |
| 2020/0219005 | A1* | 7/2020 | Valdez | G06N 20/20 |
| 2020/0357060 | A1* | 11/2020 | Dalinina | G06F 18/213 |
| 2021/0027145 | A1* | 1/2021 | Li | G06F 18/214 |
| 2021/0144167 | A1* | 5/2021 | Glukhov | H04L 63/1425 |
| 2021/0266335 | A1* | 8/2021 | Medalion | G06N 20/00 |
| 2021/0365832 | A1* | 11/2021 | Hu | G06N 20/20 |
| 2021/0383393 | A1* | 12/2021 | Abrahamian | G06F 18/24323 |
| 2022/0094709 | A1* | 3/2022 | Sharma | G06N 3/006 |
| 2022/0094713 | A1* | 3/2022 | Lee | G06F 18/214 |
| 2022/0147815 | A1* | 5/2022 | Conwell | G06N 3/045 |
| 2022/0365699 | A1* | 11/2022 | Akutsu | G06F 16/217 |
| 2023/0169366 | A1* | 6/2023 | Renehan | G06N 3/045 |
| | | | | 706/12 |
| 2023/0177512 | A1* | 6/2023 | Laptiev | G06Q 20/4016 |
| | | | | 705/44 |
| 2023/0368054 | A1* | 11/2023 | Nikolic | G06N 3/088 |
| 2024/0161014 | A1* | 5/2024 | Zhang | G06N 20/10 |

OTHER PUBLICATIONS

Vladimir Cherkassky et al., "Group Learning for High-Dimensional Sparse Data," 2019 International Joint Conference on Neural Networks (IJCNN), Budapest, Hungary, 2019, pp. 1-10 (Year: 2019).*

* cited by examiner

| Model | Boosting | Decision Tree | Neural Net | Support Vector Machine (SVM) | K-Nearest Neighbors (KNN) |
|---|---|---|---|---|---|
| Accuracy | 0.9867772878 | 0.9830271176 | 0.9785791172 | 0.98185649 | 0.051267052 |
| Precision | 0.9067796402 | 0.866984128 | ~0 | 0.848095238 | 0.564329004 |

SYSTEMS AND METHODS FOR REAL-TIME CYBER INCIDENT DETECTION IN DATA SPARSE ENVIRONMENTS USING ARTIFICIAL INTELLIGENCE

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results.

These technical problems present an inherent problem with attempting to use an artificial intelligence-based solution in real-time cyber incident detection in data sparse environments.

SUMMARY

Systems and methods are described herein for novel uses and/or improvements to artificial intelligence applications. As one example, methods and systems are described herein for real-time cyber incident detection in data sparse environments, particularly as it relates to detecting fraudulent and unauthorized communications.

For example, the transmission of fraudulent and unauthorized communications is rising, particularly in the context of mobile payments, credit card transactions, and other e-commerce communications. A challenge in addressing these fraudulent and unauthorized communications is that remedial action must be taken immediately and in real-time. If remedial action is not taken, and the unauthorized communication is successful, there may be little recourse for the fraudulent and unauthorized results. Given the ability of artificial intelligence-based applications to perform real-time determinations, artificial intelligence may appear suitable for addressing this problem. However, the adaptation of artificial intelligence models for this practical benefit faces several difficult technical challenges as artificial intelligence models must be trained to detect fraudulent and unauthorized communications and to do so with high precision and in real-time.

As an example of a technical challenge, training artificial intelligence models to detect fraudulent and unauthorized communications is difficult due to the sparse availability of high-quality training data. That is, while systems may monitor numerous communications, the vast majority of these communications are not fraudulent and unauthorized communications. Because of this, artificial intelligence models, such as neural networks, that rely on detecting unforeseen patterns in labeled training data (e.g., training data labeled as fraudulent and unauthorized) are ill-suited for such an application.

Training an artificial intelligence model to detect fraudulent and unauthorized communications is also technically challenging because the algorithm that is used must produce a real-time or near real-time decision without latency. That is, the artificial intelligence model needs to have an optimized and constant lookup time. Accordingly, models that result in a dynamic lookup time (e.g., a lookup time that fluctuates) is not ideal.

An additional technical challenge that must be overcome in the use of artificial intelligence models to detect fraudulent and unauthorized communications, is that the model must produce highly accurate and precise results. If the model results are inaccurate and lead to a false-positive, the system may cancel a legitimate and authorized communication, potentially causing severe negative consequences and a poor user experience.

To address and overcome these technical barriers, the systems and methods disclosed herein recite the use of novel artificial intelligence architecture that uses a model that may be trained in data sparse environments (e.g., environments where training data is more heavily weighted towards legitimate and authorized communications), a data transformation step that minimizes latency and ensures a constant lookup time, and an output that generates a confidence score for the detection of fraudulent and unauthorized communications. More specifically, the systems and methods use a gradient boosted decision tree, which may be trained in data sparse environments. The system also uses a data transformation step to collapse complex data into a standardized feature input (e.g., a fixed length feature input) that may be processed by the model with a constant (or near-constant) lookup time and with minimal latency. Finally, the system generates a dual variable output that provides both a metric of whether a communication is fraudulent and/or unauthorized as well as a confidence level of that determination. Notably, by using the dual variable output, the system may combine the output with third-party data (or other information) without re-formatting the data or otherwise performing steps that may contribute to latency. Accordingly, by using the aforementioned novel and unconventional artificial intelligence architecture, the system overcomes the technical challenges in adapting an artificial intelligence-based solution in real-time cyber incident detection (e.g., fraudulent and unauthorized communications) in data sparse environments (e.g., environments with a low amount of labeled training data in target classifications). Furthermore, by limiting latency, the system may be applied to scenarios in which an accurate determination as to whether or not a communication is fraudulent must be made before a third-party system processes a parallel communication (e.g., parallel processing scenarios).

In some aspects, systems and methods are described herein for real-time, cyber incident detection in parallel processed communications using machine learning models trained in data sparse environments. For example, the system may receive, at a server, a communication from a remote terminal. The system may determine, at the server, a fixed-length feature input for the communication, wherein the fixed-length feature input includes a standardized identifier corresponding to the remote terminal. The system may incorporate the fixed-length feature input into a machine learning model to generate a dual variable output, wherein the machine learning model is trained in data sparse environments to generate, using a gradient boosted decision tree, dual variable outputs based on fixed-length feature inputs representing potential cyber incidents. The system may determine, based on the dual variable output, whether or not to generate a cancelation recommendation for that communication. Based on the results of this determination, the system may transmit a cancelation recommendation to the remote terminal.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustrative diagram for results of a machine learning model used for detecting cyber incidents, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
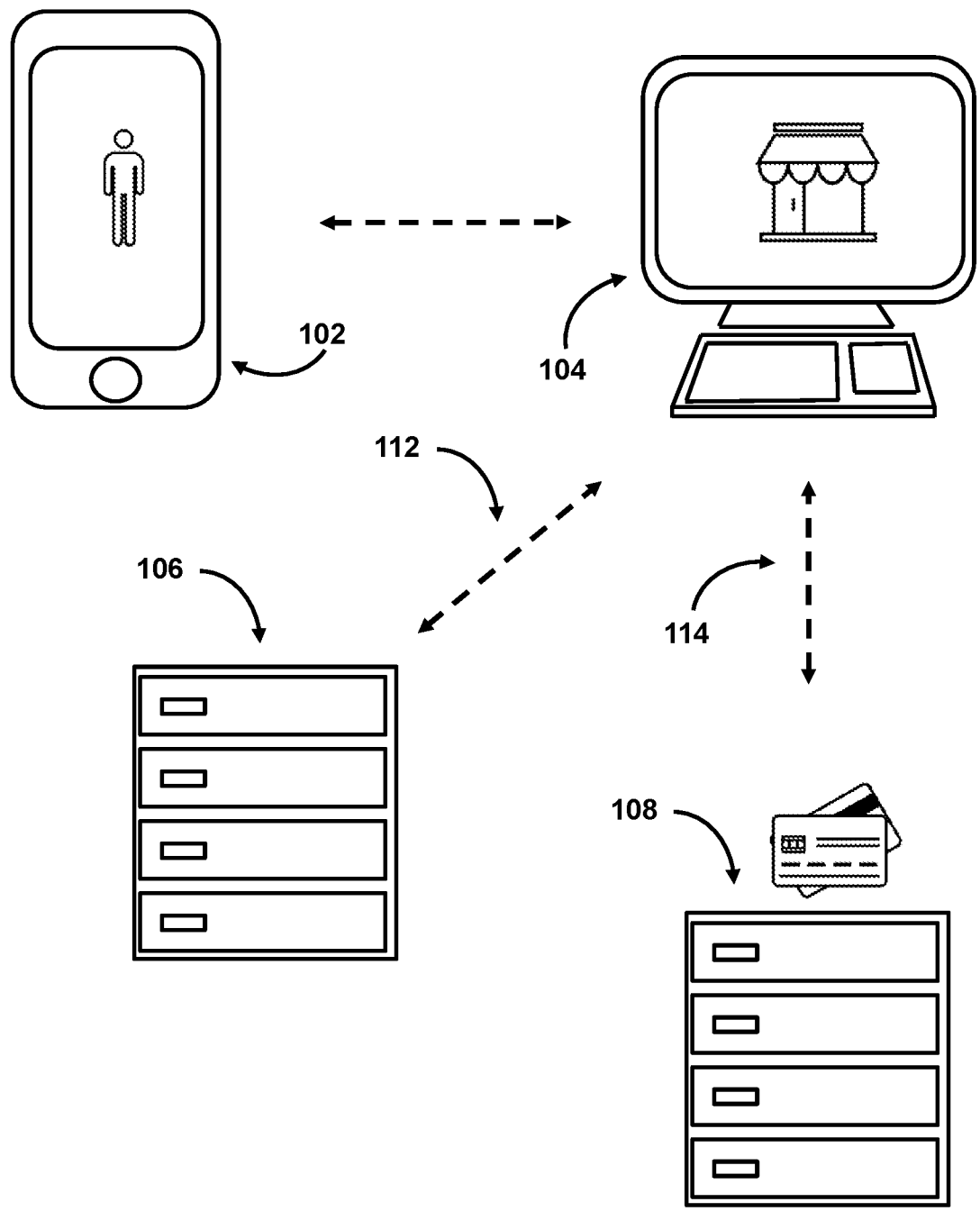
FIG. 1 shows an illustrative diagram for an architecture for cyber incident detection in parallel processed communications, in accordance with one or more embodiments.

FIG. 1 shows an illustrative diagram for an architecture for cyber incident detection in parallel processed communications, in accordance with one or more embodiments. It should be noted however that in some embodiments, the system may perform one or more actions described herein without parallel processing. For example, FIG. 1 illustrates system 100. System 100 includes user device 102. For example, user device 102 may be a user device conducting a mobile payment, credit card transaction, etc. using a point-of-sale terminal (e.g., terminal 104). For example, terminal 104 may be a device (e.g., a cash register) used to conduct a credit card transaction. While shown as a smart-phone and personal computer, respectively, in FIG. 1, it should be noted that mobile device 102 and terminal 104 may be any computing device, including, but not limited to, a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. For example, server 106 may be implemented as a cloud computing system and may feature one or more component devices. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of mobile device 102, those operations may, in some embodiments, be performed by components of server 106. In some embodiments, the various computers and systems described herein may include one or more computing devices that are programmed to perform the described functions. Additionally, or alternatively, multiple users may interact with system 100 and/or one or more components of system 100. For example, in one embodiment, a first user (e.g., a credit card holder) and a second user (e.g., a merchant/source, a credit card issuer, etc.) may interact with system 100 using two different components.

With respect to the components of mobile device 102, user terminal 104, and server 106, each of these devices may receive content and data via input/output (hereinafter "I/O") paths. Each of these devices may also include processors and/or control circuitry to send and receive commands, requests, and other suitable data using the I/O paths and I/O circuitry. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data. Additionally, as mobile device 102 and user terminal 104 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 100 may run an application (or another suitable program).

In response to a request from user device 102, terminal 104 may attempt to authorize a communication from user device 102. For example, the communication may comprise a credit card transaction. Server 106 may in response provide for real-time, cyber incident detection (e.g., fraud detection) for the communication. For example, while terminal 104 may send a communication to server 108 (e.g., corresponding to a credit issuer), terminal 104 may also transmit the communication in parallel to server 106 for processing the communication using one or more machine learning models (e.g., which may include artificial intelligence models, neural networks, and/or other machine learning models) trained in data sparse environments.

Server 106 may be a database configured to store user data, record data, and/or process requests for detecting cyber incidents, determine user record data, resolve conflicts, generate user queries, compare source data, and/or generate confidence levels. For example, the database may include user record data that the system has collected about the user through prior transactions. Alternatively, or additionally, the system may act as a clearing house for multiple sources of information about the user.

For example, server 106 (which may comprise a cyber incident detection system) may comprise control circuitry configured to receive a communication from terminal 104, wherein the communication is processed in parallel by a third-party verification system (e.g., server 108) and server 106 (e.g., the cyber incident detection system). Server 106 may determine a fixed-length feature input for the communication, wherein the fixed-length feature input includes a standardized identifier corresponding to terminal 104. Server 106 may input the fixed-length feature input into the machine learning model to generate a dual variable output, wherein the dual variable output comprises a communication classification and a confidence level of the communication classification. Server 106 may determine, based on the dual variable output, whether the communication is fraudulent and/or unauthorized. Server 106 may also include input/output circuitry configured to, in response to determining that the communication is fraudulent and/or unauthorized, transmit a cancelation request to the remote terminal.

The likelihood that a communication may comprise a fraudulent and/or unauthorized communication may be expressed as a confidence level. As referred to herein, a confidence level may include a qualitative or quantitative assessment of the likelihood that a recommendation is correct. The confidence level may be adjusted to provide comparisons of transactions, user record data, source data (including network names or other source data), particular values (e.g., source data category value), responses to user queries and/or any other data that the aggregation service needs to compare to facilitate aggregating user accounts.

In some embodiments, a request to detect cyber incidents, resolve conflicts, generate user queries, compare source data, and/or generate confidence levels may be structured as an API request that includes a URL, body, and method. The API request may correspond to one half of the API request-response cycle between one or more devices and/or applications to complete the request. For example, the system (e.g., mobile device 102 and server 106) may communicate in HTTP (Hyper Text Transfer Protocol) through a request-response cycle. To make a valid request, the requester (e.g., mobile device 102) may include a URL (Uniform Resource Locator), method, list of headers, and/or body. The URL may indicate to server 106 (or other component) what resources to use (e.g., "CancelationRecommendationApplication"). The body may contain headers and data. The headers may provide metadata about the request (e.g., the name of the requester, the user account for which access is needed, etc.) and the body may indicate the name of the user for which a request relates.

System 100 may be used to detect cyber incidents, resolve conflicts, generate user queries, compare source data, and/or generate confidence levels. One component may be an application running on a mobile device of a user (e.g., mobile device 102). As referred to herein, user record data may include any data related to a transaction. For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)). For example, an exemplary record of data for a transaction may include:

Transaction ID: 01234
Timestamp: 1/1/2020 01:30:55 AM UTC
Price: $57.98
Payment Currency: USD
Card Present: True
Merchant ID: 12345

Through the user of the application, the system may allow a user to transmit a request using mobile device 102. In response to receiving the request, the cyber incident detection system (e.g., located at server 106) may process the request and initiate an application to respond to the request.

For example, system 100 may involve multiple components and involve requests from one or more entities such as cardholder corresponding to mobile device 102. For example, a given user may have multiple credit card accounts and thus correspond to a cardholder for multiple credit card networks. It should be noted that as referred to herein a credit card network may include debit cards, e-commerce accounts, source credit, and other electronic payment and/or monetary systems, such as online user currency accounts, cryptocurrencies, credit provider accounts, gift card accounts, etc.

System 100 may also include terminal 104, which may be associated with a store and/or vendor that sells goods and/or services to the cardholder. A source, which may be a merchant, may accept credit card payments. The source may also send card and/or user account information to, and request payment authorization from, an issuing bank of cardholder (e.g., server 108). The source may be assigned information by a network upon registration. That information may include a merchant/source ID, a network name, and an address. The network may further generate a cleansed network name based on a native network name (e.g., a network name based on a proprietary and/or non-public algorithm for generating a network name based on available data of a merchant when the merchant registers with the network).

For example, communications received from different remote terminals (e.g., different point-of-sale machines, mobile payment applications, digital sale devices, etc.) such as terminal 104 may use different identifying information for the source (e.g., the provider of the point-of-sale machines, mobile payment applications, digital sale devices, etc.). In some embodiments, this information may be of variable lengths, different formats, and/or with missing data. Due to the differences in this information, conventional systems may struggle to process the varying types of information leading to dynamic processing times. To prevent this, the system first transforms the data into a standardized format.

For example, as part of a request, an exemplary source record for a network may include:

Merchant ID: 12345
Network Name: Josh's Board Game Store
Address: 1234 Main St. City, State 12346

Server 108 may correspond to an acquiring bank, which may also comprise an acquiring processor or service provider. For example, the acquiring bank may receive payment authorization requests from terminal 104 and send them to an issuing bank (which may include, or be a separate entity from, acquiring bank). The acquiring bank may then relay a response from issuing bank to terminal 104. In some embodiments, the acquiring bank may be a third-party entity. The acquiring bank may provide a service or device that allows terminal 104 to accept credit cards as well as send credit card payment details to a network. Upon receipt, the network may forward the payment authorization back to acquiring bank.

The network may include entities that operate credit card networks that process credit card payments worldwide and govern interchange fees. In some embodiments, an issuing bank may form part of the network. For example, the issuing bank may be a financial institution that issued the credit card involved in the transaction. The issuing bank may receive the payment authorization request from the credit card network and either approve or decline the transaction.

During processing, the components of system 100 may use multiple naming conventions, formats, and value types of a category, value, etc. and these may differ from that of the user profile data (as stored on a user device or an aggregation service). Server 106 (or other component of system 100) may use matching algorithms that may support exact match techniques and/or partial or "fuzzy" matching logic (e.g., searching for a closest or partial match) to locate alternate spellings, naming conventions, etc. for categories and/or value. For example, a column name associated with user data stored by a cyber incident detection system may be compared to a category and/or value for the issuing bank. In another example, metadata associated with user data stored by a cyber incident detection system (e.g., describing a transaction in the account of the user) may be compared to metadata of a corresponding record, entry, category, and/or value for the issuing bank.

For example, credit card transactions are processed through a variety of platforms, including brick-and-mortar stores, e-commerce stores, wireless terminals, and phone or mobile devices. The entire authorization cycle occurs within two to three seconds, and the transaction process includes three stages of authorization, clearing, and settlement, in which clearing and settlement may take place simultaneously. In an authorization stage, server 108 must obtain approval for payment from the issuing bank. Server 108 may transmit record data that may include: a credit card number, card expiration date, billing address (e.g., for address verification system ("AVS")), a validation card security code ("CVV"), and/or a payment amount.

As the process of clearing these transactions may only take a few seconds, a challenge in addressing these in fraudulent and unauthorized communications is that remedial action must be taken immediately and in real-time. If remedial action is not taken, and the unauthorized communication is successful, there may be little recourse for the fraudulent and unauthorized results. To overcome this technical challenge, the system uses a novel and unconventional artificial intelligence architecture. The system overcomes the technical challenges by limiting latency in its fraud detection. As such, the system (e.g., server 106) may be applied to scenarios in which a recommendation as to whether or not a communication is fraudulent must be generated before a third-party system processes a parallel communication (e.g., parallel processing scenarios). In particular, server 106 may return a recommendation as to whether or not the communication is fraudulent prior to the transaction being cleared by server 108.

For example, upon determining that a communication (e.g., a transaction) is fraudulent and/or unauthorized at server 106 (or that the confidence level equals or exceeds a given threshold), the system may transmit a cancelation recommendation to terminal 104. Accordingly, even if the terminal 104 receives an approval from server 108, the communication does not go through. Additionally or accordingly, in response to the cancelation recommendation, server 106 may query server 108, terminal 104, or device 102 for more information. This may include additional user profile information, the user of a higher standard or threshold (e.g., used by server 108), and/or the selection of a new algorithm. For example, the cancelation recommendation may cause a higher level of security and/or higher level of security protocols to be enacted.

In some embodiments, the system may retrieve a user profile for a user. The user profile may include data that is actively or passively compiled on a user. For example, the data may include demographic, geographic, and/or financial data on the user. The data may indicate the preferences, tastes, habits, and/or recent activities of the user (e.g., recent purchases). The user profile may comprise a digital representation of the user. This representation may be organized into a user profile and behaviors of the user, including likely purchases and sources from which purchases were made. The representation may include any information about an event, course of action, or other circumstance related to the user. For example, the scenario may include where a user last shopped, where the user normally shops, what items were purchased, etc. The profile may also include a behavior for the user in the given scenario (e.g., the manner, way, characteristics, and/or any other information about the user's conduct in a scenario). The profile may also include one or more categories in which the user falls. These categories may be used by the system to select other users to compare to the users. The categories may include any information that distinguishes one user from another, or from a group of other users.

The user profile may include data of various types and from various sources. For example, the user profile may include data on credit/debit card purchases, purchasing trends (e.g., where the user spends, what the user buys, how much the user spends), phone call interactions (e.g., how often a user calls, the number called, and the number called from), digital engagement history of the user (e.g., does the user use a mobile app, what devices does the user use, when and how often does the user log in), text/chat history, map and global positioning data (e.g., where the user is located, where the user has been located in the past, areas frequented by a user, distances traveled by a user, where does a user shop, where were purchases of the user, etc.).

The system may record the scenarios, behaviors, and user profiles as records in a database. The records may include fields with particular values corresponding to given behaviors. For example, a value for a behavior related to a shopping scenario may indicate what a user purchased, for how much, or where a user purchased a good or service. In some embodiments, the system may store alphanumeric values (e.g., describing a product that was purchased). For example, a value may in some embodiments include any quantitative or qualitative measure of the behavior of a user in a given scenario.

FIG. 2 shows an illustrative diagram for results of a machine learning model used for detecting cyber incidents, in accordance with one or more embodiments. For example, FIG. 2 includes table 200, which illustrates the detected accuracy and precision for various models. In particular, table 200 indicates that the "boosting" model (e.g., a gradient boosted decision tree) provides the best accuracy and precision. As shown in table 200, the boosting model has an accuracy above ninety-five percent and a precision above ninety percent, meaning that it outperforms other models.

For example, table 200 may refer to a machine learning model, wherein the machine learning model is trained in data sparse environments to generate, using a gradient boosted decision tree, dual variable outputs based on fixed-length feature inputs representing potential cyber incidents, and wherein the gradient boosted decision tree comprises a loss function that estimates the accuracy of the machine learning model, a plurality of decision trees, and an additive model.

For example, the model may use gradient boosting which comprises ensemble learning to build a strong model by using a collection (or "ensemble") of "weaker" models. The gradient boosted decision tree comprises a loss function that estimates the accuracy of the machine learning model, a plurality of decision trees, and an additive model. For example, the loss function estimates how good the model is at making predictions with the given data. The weaker models comprise one or more decision trees. The additive model may use an iterative and/or sequential approach of adding the trees (weak learners) one step at a time. After each iteration, the system should reduce the value of the loss function. For example, the system may generate a model based on a target classification. If a target is a classification outcome taking on values 0,1, . . . ,K−1, for node m, let $$p_{mk} = 1/N_m \sum_{y \in Q_m} I(y = k)$$

be the proportion of class k observations in node m. If m is a terminal node, a predicted probability for this region is set to $p_{mk}$. The system may then use one or more measurement units of impurity (e.g., a measure of the extent of purity for a region containing data points from possibly different classes) such as gini. The gini impurity measures the frequency at which any element of the dataset will be mislabelled when it is randomly labeled. The minimum value of the Gini Index is 0. This happens when the node is pure, this means that all the contained elements in the node are of one unique class. Gini is defined as:

$$H(Q_m) = \sum_k p_{mk}(1 - p_{mk})$$

Additionally or alternatively, the system may use entropy. Entropy is the degree of uncertainty, impurity or disorder of a random variable, or a measure of purity. It characterizes the impurity of an arbitrary class of examples. Entropy is the measurement of impurities or randomness in the data points. Entropy is defined as:

$$H(Q_m) = -\sum_k p_{mk} \log(p_{mk})$$

Additionally or alternatively, the system may use misclassification and/or a misclassification rate. A "classification error" is a single instance in which your classification was incorrect, and a "misclassification" is the same thing, whereas "misclassification error" is a double negative. "Misclassification rate", on the other hand, is the percentage of classifications that were incorrect. misclassification is defined as:

$$H(Q_m) = 1 - \max(p_{mk})$$

The system may optimize a decision tree to minimize one or more of the aforementioned measures of impurity.

Figure 3:
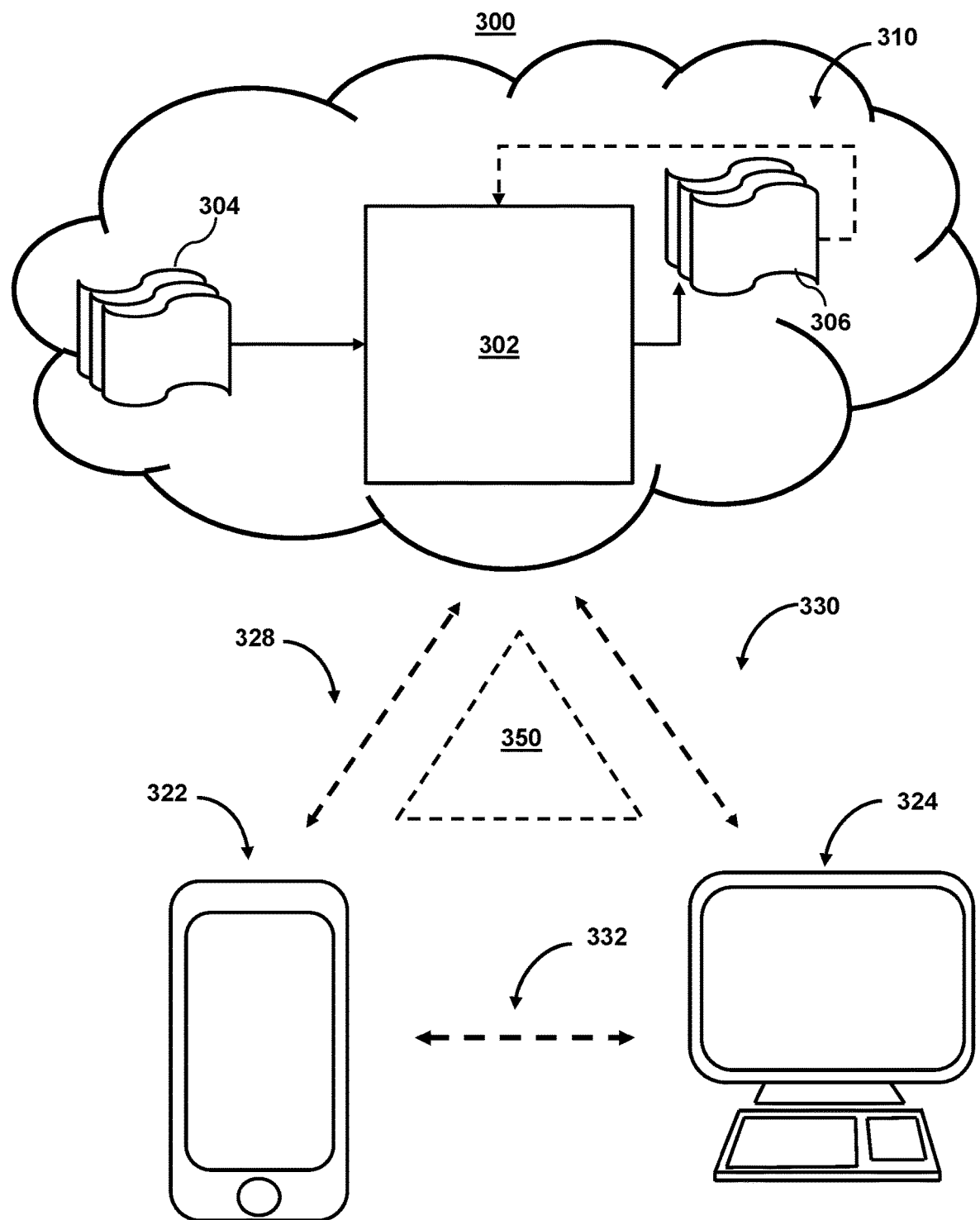
FIG. 3 shows illustrative components for a system used to detect cyber incidents, in accordance with one or more embodiments.

FIG. 3 shows illustrative components for a system used to detect cyber incidents, in accordance with one or more embodiments. For example, FIG. 3 may show illustrative components for real-time, cyber incident detection in parallel processed communications using machine learning models trained in data sparse environments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a fraudulent and/or unauthorized communication, a confidence level in a recommendation, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors to be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be entered into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a fraudulent and/or unauthorized communication, a confidence level in a recommendation, etc.).

In some embodiments, the model (e.g., model 302) may automatically perform actions based on outputs 306. In some embodiments, the model (e.g., model 302) may not perform any actions. The output of the model (e.g., model 302) may be used to determine whether a communication is a fraudulent and/or unauthorized communication, determine a confidence level in a recommendation, etc.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
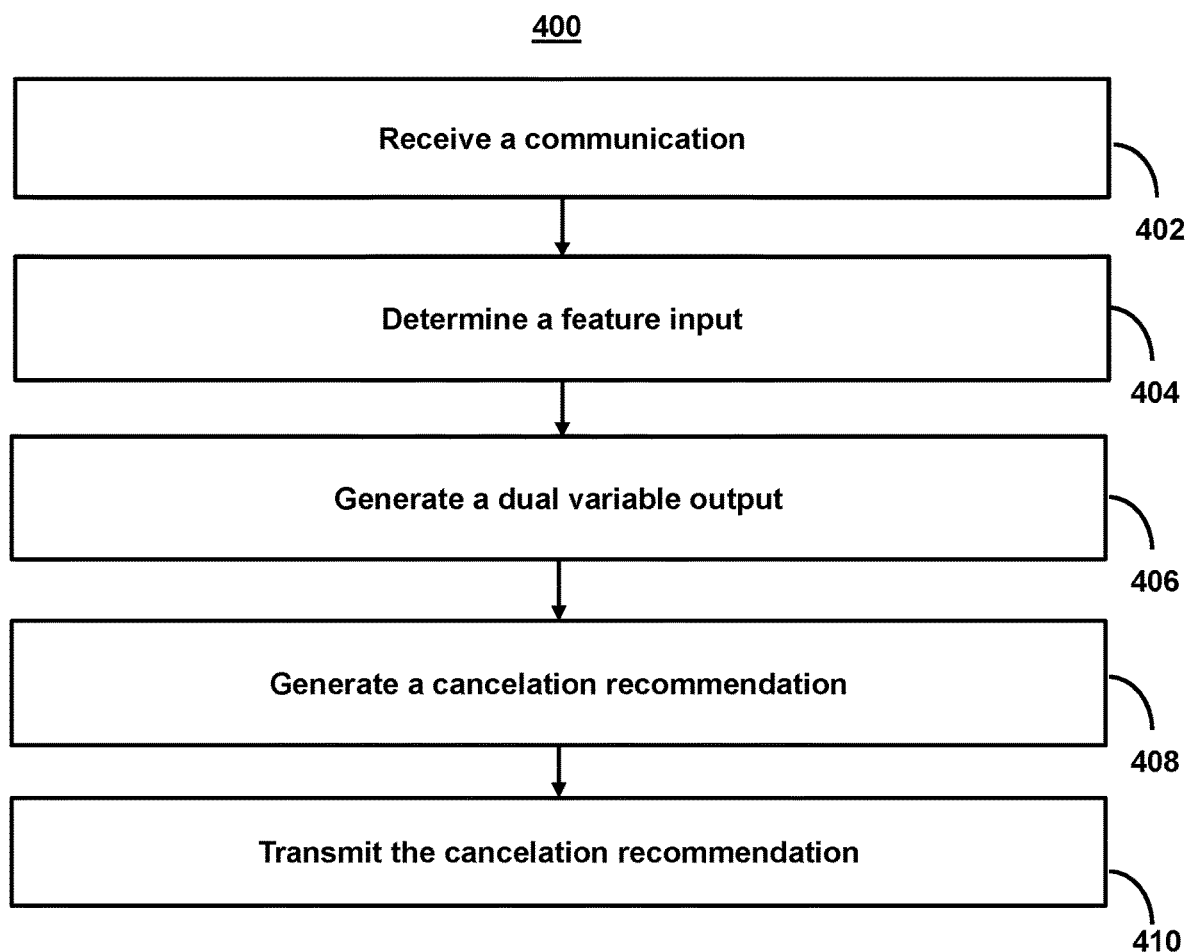
FIG. 4 shows a flowchart of the steps involved in real-time, cyber incident detection in parallel processed communications using machine learning models trained in data sparse environments, in accordance with one or more embodiments.

FIG. 4 shows a flowchart of the steps involved in real-time, cyber incident detection in parallel processed communications using machine learning models trained in data sparse environments, in accordance with one or more embodiments. For example, the system may use process 400 (e.g., as implemented on one or more system components described above) in order to determine whether a communication (e.g., a credit card transaction) is fraudulent and/or unauthorized. For example, the machine learning model may have accuracy above ninety-five percent and a precision above ninety percent for detecting cyber incidents.

At step 402, process 400 (e.g., using one or more components described above) receives a communication. For example, the system may receive, at a server, a communication from a remote terminal. For example, the communication may comprise a potential credit card transaction.

At step 404, process 400 (e.g., using one or more components described above) receives a communication. For example, the system may determine, at the server, a fixed-length feature input for the communication, wherein the fixed-length feature input includes a standardized identifier corresponding to the remote terminal.

In some embodiments, the system may determine the fixed-length feature input for the communication by generating a multithread communication based on the communication and generating a plurality of processing requests based on the multithread communication. For example, multithreading is a model of program execution that allows for multiple threads to be created within a process, executing independently but concurrently sharing process resources. Multithreading also leads to minimization and more efficient use of computing resources. Application responsiveness is improved as requests from one thread do not block requests from other threads. Additionally, multithreading is less resource-intensive than running multiple processes at the same time. The system may use the multithreading to generate multiple processing requests such as generating feature inputs, selecting a machine learning model, determining internal deadlines, determining threshold response times, determining threshold confidence levels, etc.

In some embodiments, determining the fixed-length feature input for the communication may comprise the system retrieving source identification information from the communication and inputting the source identification information into a database listing standardized identifiers corresponding to respective source identification information to determine the standardized identifier. For example, communications received from different remote terminals (e.g., different point-of-sale machines, mobile payment applications, digital sale devices, etc.) may use different identifying information for the source (e.g., the provider of the point-of-sale machines, mobile payment applications, digital sale devices, etc.). In some embodiments, this information may be of variable length, different formats, and/or with missing data. Due to the differences in this information, conventional systems may struggle to process the varying types of information leading to dynamic processing times. To prevent this, the system first transforms the data into a standardized format.

At step 406, process 400 (e.g., using one or more components described above) receives a communication. For example, the system may input the fixed-length feature input into a machine learning model to generate a dual variable output, wherein the machine learning model is trained in data sparse environments to generate, using a gradient boosted decision tree, dual variable outputs based on fixed-length feature inputs representing potential cyber incidents.

For example, the system may generate a dual variable output that comprises a communication classification and a confidence level of the communication classification. By using the dual variable output, the system may easily combine the output with other information (e.g., account balance information from other sources) in order to determine whether or not to generate a cancelation request. Thus, the dual variable output format increases the efficiency of the system and reduces latency. For example, the system may determine, using the machine learning model, a first variable output of the dual variable output, wherein the first variable output comprises a communication classification, and wherein the communication classification comprises a binary representation of whether the communication is fraudulent and/or unauthorized. The system may determine, using the machine learning model, a second variable output of the dual variable output, wherein the second variable output comprises a confidence level of the communication classification.

In another example, the system may apply different confidence thresholds based on characteristics about the communication. For example, the system may adjust the confidence threshold that is applied based on the communication relating to a transaction of a given amount, a transaction occurring at a given time, the transaction occurring at a given location, etc. By doing so, the system may respond in a more versatile manner. For example, the system may determine, using the machine learning model, a first value of the first variable output of the dual variable output. The system may retrieve a communication characteristic of the communication from the remote terminal, wherein the communication characteristic is not included in the fixed-length feature input. The system may select a first confidence threshold of a plurality of confidence thresholds based on the first value and the communication characteristic.

In some embodiments, selecting the first confidence threshold of the plurality of confidence thresholds based on the first value and the communication characteristic may further comprise the system retrieving a user profile corresponding to the communication, retrieving a user characteristic from the user profile, and comparing the user profile to the user characteristic to determine which of the plurality of confidence thresholds to select. For example, the system may retrieve communication characteristics and compare those characteristics to user characteristics stored in a user profile. The system may then determine which confidence threshold to apply based on the comparison. For example, if the communication relates to a transaction, the system may determine if the user (e.g., based on the user characteristic) has previously made a similar transaction. If the communication relates to a transaction amount, the system may determine if the user (e.g., based on the user characteristic) has previously made transactions of a similar amount. If the communication relates to a transaction location, the system may determine if the user (e.g., based on the user characteristic) is currently located in (e.g., based on GPS data) or has been known to historically reside in the location.

At step 408, process 400 (e.g., using one or more components described above) receives a communication. For example, the system may determine, based on the dual variable output, whether to generate a cancelation recommendation to the remote terminal.

In some embodiments, the system may use various factors for determining a cancelation recommendation. For example, the system may determine, using the machine learning model, a first value of the first variable output of the dual variable output. The system may select a first confidence threshold of a plurality of confidence thresholds based on the first variable output having the first value. The system may determine, using the machine learning model, a second value of the second variable output of the dual variable output. The system may compare the second value to the first confidence threshold to determine whether to generate the cancelation recommendation. For example, the system may apply different confidence thresholds based on whether or not the first value indicates that the communication is fraudulent and/or unauthorized or whether the first value indicates that the communication is not fraudulent and/or is authorized. By doing so, the system may set different confidence thresholds to minimize false positives.

At step 410, process 400 (e.g., using one or more components described above) receives a communication. For example, the system may, in response to determining to generate the cancelation recommendation to the remote terminal, transmit the cancelation recommendation to the remote terminal.

In some embodiments, the system may further determine a response time for the cancelation recommendation. For example, the system may determine a response time for the cancelation recommendation. The system may then select the machine learning model from a plurality of machine learning models based on the response time. For example, the system may need to ensure that any cancelation request for the communication is transmitted before a corresponding response is received from a third party (e.g., the third party that is parallel processing the communication). If the corresponding response is received from the third party before the cancelation request, the third party may authorize the communication, and the communication may proceed. In such a case, the system may lose the ability to cancel the communication. Because of this, the system may select a machine learning model that has a lookup time that ensures the cancelation request, if any, is transmitted to the remote terminal before the corresponding response.

In some embodiments, the system may also determine one or more threshold response times. For example, the system may determine a threshold response time, wherein the threshold response time is based on an amount of time required for a third-party verification system to process the communication in parallel. The system may generate a deadline for generating the cancelation recommendation to the remote terminal based on the threshold response time. For example, as the system may lose the ability to cancel the communication if a third-party verification system (e.g., a system processing the communication in parallel) authorizes the communication prior to the cancelation recommendation being transmitted, the system may first generate an internal deadline for sending the cancelation recommendation. The system may use this internal deadline to select the machine learning model from a plurality of machine learning models that processes the communication, a confidence threshold, additional queries for communication characteristics, etc. For example, the system may select a confidence threshold that may be generated (or compared against) more quickly in order to meet the deadline.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, at a server, a communication from a remote terminal; determining, at the server, a fixed-length feature input for the communication, wherein the fixed-length feature input includes a standardized identifier corresponding to the remote terminal; inputting the fixed-length feature input into a machine learning model to generate a dual variable output, wherein the machine learning model is trained in data sparse environments to generate, using a gradient boosted decision tree, dual variable outputs based on fixed-length feature inputs representing potential cyber incidents, and wherein the dual variable output; determining, based on the dual variable output, whether to generate a cancelation recommendation to the remote terminal; and in response to determining that to generate the cancelation recommendation to the remote terminal, transmitting the cancelation recommendation to the remote terminal.

2. A method of the preceding embodiment, wherein the method is for real-time, cyber incident detection in parallel processed communications using machine learning models trained in data sparse environments.

3. The method of claim 2, further comprising: determining, using the machine learning model, a first variable output of the dual variable output, wherein the first variable output comprises a communication classification, and wherein the communication classification comprises a binary representation of whether the communication is fraudulent and/or unauthorized; and determining, using the machine learning model, a second variable output of the dual variable output, wherein the second variable output comprises a confidence level of the communication classification.

4. The method of claim 3, wherein determining whether to generate the cancelation recommendation comprises: determining, using the machine learning model, a first value of the first variable output of the dual variable output; selecting a first confidence threshold of a plurality of confidence thresholds based on the first variable output having the first value; determining, using the machine learning model, a second value of the second variable output of the dual variable output; and comparing the second value to the first confidence threshold to determine whether to generate the cancelation recommendation.

5. The method of claim 3, wherein determining whether to generate the cancelation recommendation comprises: determining, using the machine learning model, a first value of the first variable output of the dual variable output; retrieving a communication characteristic of the communication from the remote terminal, wherein the communication characteristic is not included in the fixed-length feature input; and selecting a first confidence threshold of a plurality of confidence thresholds based on the first value and the communication characteristic.

6. The method of claim 5, wherein selecting the first confidence threshold of the plurality of confidence thresholds based on the first value and the communication characteristic further comprises: retrieving a user profile corresponding to the communication; retrieving a user characteristic from the user profile; and comparing the user profile to the user characteristic to determine which of the plurality of confidence thresholds to select.

7. The method of claim 2, wherein determining, at the server, the fixed-length feature input for the communication further comprises: retrieving source identification information from the communication; inputting the source identification information into a database listing standardized identifiers corresponding to respective source identification information to determine the standardized identifier.

8. The method of claim 2, further comprising: determining a response time for the cancelation recommendation; and selecting the machine learning model from a plurality of machine learning models based on the response time.

9. The method of claim 8, further comprising: determining a threshold response time, wherein the threshold response time is based on an amount of time required for a third-party verification system to process the communication in parallel; and generating a deadline for generating the cancelation recommendation to the remote terminal based on the threshold response time.

10. The method of claim 2, wherein determining the fixed-length feature input for the communication further comprises: generating a multithread communication based on the communication; and generating a plurality of processing requests based on the multithread communication.

11. The method of claim 2, wherein the machine learning model has an accuracy above ninety-five percent and a precision above ninety percent.

12. A tangible, non-transitory, machine-readable medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A method for real-time, cyber incident detection in parallel processed communications using machine learning models trained in data sparse environments, the method comprising:
   receiving, at a server, a communication from a remote terminal;
   determining, at the server, a fixed-length feature input for the communication, wherein the fixed-length feature input includes a standardized identifier corresponding to the remote terminal;
   determining a response time for a cancelation recommendation;
   selecting a machine learning model from a plurality of machine learning models based on the response time;
   inputting the fixed-length feature input into the machine learning model to generate a dual variable output, wherein the machine learning model is trained in data sparse environments to generate, using a gradient boosted decision tree, dual variable outputs based on fixed-length feature inputs representing potential cyber incidents;
   determining, based on the dual variable output, whether to generate the cancelation recommendation to the remote terminal; and
   in response to determining to generate the cancelation recommendation to the remote terminal, transmitting the cancelation recommendation to the remote terminal.

2. The method of claim 1, further comprising:
   determining, using the machine learning model, a first variable output of the dual variable output, wherein the first variable output comprises a communication classification, and wherein the communication classification comprises a binary representation of whether the communication is fraudulent and/or unauthorized; and
   determining, using the machine learning model, a second variable output of the dual variable output, wherein the second variable output comprises a confidence level of the communication classification.

3. The method of claim 2, wherein determining whether to generate the cancelation recommendation comprises:
   determining, using the machine learning model, a first value of the first variable output of the dual variable output;
   selecting a first confidence threshold of a plurality of confidence thresholds based on the first variable output having the first value;
   determining, using the machine learning model, a second value of the second variable output of the dual variable output; and
   comparing the second value to the first confidence threshold to determine whether to generate the cancelation recommendation.

4. The method of claim 2, wherein determining whether to generate the cancelation recommendation comprises:
- determining, using the machine learning model, a first value of the first variable output of the dual variable output;
- retrieving a communication characteristic of the communication from the remote terminal, wherein the communication characteristic is not included in the fixed-length feature input; and
- selecting a first confidence threshold of a plurality of confidence thresholds based on the first value and the communication characteristic.

5. The method of claim 4, wherein selecting the first confidence threshold of the plurality of confidence thresholds based on the first value and the communication characteristic further comprises:
- retrieving a user profile corresponding to the communication;
- retrieving a user characteristic from the user profile; and
- comparing the user profile to the user characteristic to determine which of the plurality of confidence thresholds to select.

6. The method of claim 1, wherein determining, at the server, the fixed-length feature input for the communication further comprises:
- retrieving source identification information from the communication; and
- inputting the source identification information into a database listing standardized identifiers corresponding to respective source identification information to determine the standardized identifier.

7. The method of claim 1, further comprising:
- determining a threshold response time, wherein the threshold response time is based on an amount of time required for a third-party verification system to process the communication in parallel; and
- generating a deadline for generating the cancelation recommendation to the remote terminal based on the threshold response time.

8. The method of claim 1, wherein determining the fixed-length feature input for the communication further comprises:
- generating a multithread communication based on the communication; and
- generating a plurality of processing requests based on the multithread communication.

9. The method of claim 1, wherein the machine learning model has an accuracy above ninety-five percent and a precision above ninety percent.

10. A non-transitory, computer-readable medium, comprising instructions that, when executed by one or more processors, cause operations comprising:
- receiving, at a server, a communication from a remote terminal;
- determining, at the server, a fixed-length feature input for the communication, wherein the fixed-length feature input includes a standardized identifier corresponding to the remote terminal;
- determining a response time for a cancelation recommendation;
- selecting a machine learning model from a plurality of machine learning models based on the response time;
- inputting the fixed-length feature input into the machine learning model to generate a dual variable output, wherein the machine learning model is trained in data sparse environments to generate, using a gradient boosted decision tree, dual variable outputs based on fixed-length feature inputs representing potential cyber incidents;
- determining, based on the dual variable output, whether to generate the cancelation recommendation to the remote terminal; and
- in response to determining to generate the cancelation recommendation to the remote terminal, transmitting the cancelation recommendation to the remote terminal.

11. The non-transitory, computer-readable medium of claim 10, wherein the instructions further cause operations comprising:
- determining, using the machine learning model, a first variable output of the dual variable output, wherein the first variable output comprises a communication classification, and wherein the communication classification comprises a binary representation of whether the communication is fraudulent and/or unauthorized; and
- determining, using the machine learning model, a second variable output of the dual variable output, wherein the second variable output comprises a confidence level of the communication classification.

12. The non-transitory, computer-readable medium of claim 11, wherein determining whether to generate the cancelation recommendation comprises:
- determining, using the machine learning model, a first value of the first variable output of the dual variable output;
- selecting a first confidence threshold of a plurality of confidence thresholds based on the first variable output having the first value;
- determining, using the machine learning model, a second value of the second variable output of the dual variable output; and
- comparing the second value to the first confidence threshold to determine whether to generate the cancelation recommendation.

13. The non-transitory, computer-readable medium of claim 11, wherein determining whether to generate the cancelation recommendation comprises:
- determining, using the machine learning model, a first value of the first variable output of the dual variable output;
- retrieving a communication characteristic of the communication from the remote terminal, wherein the communication characteristic is not included in the fixed-length feature input; and
- selecting a first confidence threshold of a plurality of confidence thresholds based on the first value and the communication characteristic.

14. The non-transitory, computer-readable medium of claim 13, wherein selecting the first confidence threshold of the plurality of confidence thresholds based on the first value and the communication characteristic further comprises:
- retrieving a user profile corresponding to the communication;
- retrieving a user characteristic from the user profile; and
- comparing the user profile to the user characteristic to determine which of the plurality of confidence thresholds to select.

15. The non-transitory, computer-readable medium of claim 10, wherein determining, at the server, the fixed-length feature input for the communication further comprises:
- retrieving source identification information from the communication; and inputting the source identification information into a database listing standardized identifiers corresponding to respective source identification information to determine the standardized identifier.

16. The non-transitory, computer-readable medium of claim 10, wherein the instructions further cause operations comprising:

determining a threshold response time, wherein the threshold response time is based on an amount of time required for a third-party verification system to process the communication in parallel; and generating a deadline for generating the cancelation recommendation to the remote terminal based on the threshold response time.

17. The non-transitory, computer-readable medium of claim 10, wherein determining the fixed-length feature input for the communication further comprises:

generating a multithread communication based on the communication; and generating a plurality of processing requests based on the multithread communication.

18. The non-transitory, computer-readable medium of claim 10, wherein the gradient boosted decision tree comprises a loss function that estimates an accuracy of the machine learning model, a plurality of decision trees, and an additive model, and wherein the dual variable output comprises a communication classification and a confidence level of the communication classification.

19. The non-transitory, computer-readable medium of claim 10, wherein the machine learning model has an accuracy above ninety-five percent and a precision above ninety percent.

* * * * *